United States Patent
Angst

(10) Patent No.: US 8,679,237 B2
(45) Date of Patent: Mar. 25, 2014

(54) CENTRIFUGAL OIL SEPARATOR FOR AN AIRCRAFT ENGINE

(75) Inventor: Robert Angst, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 493 days.

(21) Appl. No.: 13/097,325

(22) Filed: Apr. 29, 2011

(65) Prior Publication Data

US 2012/0204723 A1 Aug. 16, 2012

(30) Foreign Application Priority Data

May 6, 2010 (DE) .......................... 10 2010 019 605

(51) Int. Cl.
B03C 3/15 (2006.01)
(52) U.S. Cl.
USPC .................... 96/61; 55/408; 55/409; 95/78
(58) Field of Classification Search
USPC ........... 96/55, 61; 95/63, 70, 78; 55/408, 409, 55/DIG. 17, DIG. 19; 244/1 R
See application file for complete search history.

(56) References Cited

U.S. PATENT DOCUMENTS

| | | | | |
|---|---|---|---|---|
| 1,558,382 | A * | 10/1925 | Marx | 204/545 |
| 2,537,558 | A * | 1/1951 | Tigges | 95/70 |
| 3,443,362 | A * | 5/1969 | Ebert | 96/50 |
| 4,049,401 | A | 9/1977 | Smith | |
| 4,755,103 | A | 7/1988 | Streifinger | |
| 6,663,695 | B2 * | 12/2003 | Ike et al. | 96/52 |
| 6,858,056 | B2 | 2/2005 | Kwan | |
| 7,510,599 | B2 * | 3/2009 | Brothier et al. | 96/29 |
| 7,569,094 | B2 * | 8/2009 | Kane et al. | 95/28 |
| 7,704,300 | B2 * | 4/2010 | Szepessy | 95/69 |
| 7,721,555 | B2 * | 5/2010 | Sharp et al. | 60/802 |
| 8,029,601 | B2 * | 10/2011 | Franzen et al. | 95/77 |
| 2008/0078291 | A1 * | 4/2008 | Daukant | 95/69 |

FOREIGN PATENT DOCUMENTS

| | | | |
|---|---|---|---|
| DE | 2604180 | 9/1983 | |
| DE | 3605619 | 8/1987 | |
| DE | 102006058343 | 7/2008 | |
| EP | 1297879 | 4/2003 | |
| JP | 61-167466 A * | 7/1986 | 96/61 |

OTHER PUBLICATIONS

German Search Report dated Mar. 4, 2011 from counterpart application.
European Search Report dated Jul. 21, 2011 from counter application.

* cited by examiner

*Primary Examiner* — Richard L Chiesa
(74) *Attorney, Agent, or Firm* — Timothy J. Klima; Shuttleworth & Ingersoll, PLC

(57) ABSTRACT

On a centrifugal oil separator for an aircraft engine for separating the oil particles contained in the vent air, a metallic foam body (7), into which the loaded vent airflow (3) is introduced, is firmly integrated into a hollow-type engine shaft (1), while high-voltage electrodes (6), which electrostatically charge the oil droplets in the vent air, are arranged outside the engine shaft (1) within the vent airflow (3) forwarded to the engine shaft (1). The simply designed oil separator, which can be space-savingly arranged and cost-effectively produced, ensures efficient separation of even minute oil droplets from the air-oil mixture.

3 Claims, 1 Drawing Sheet

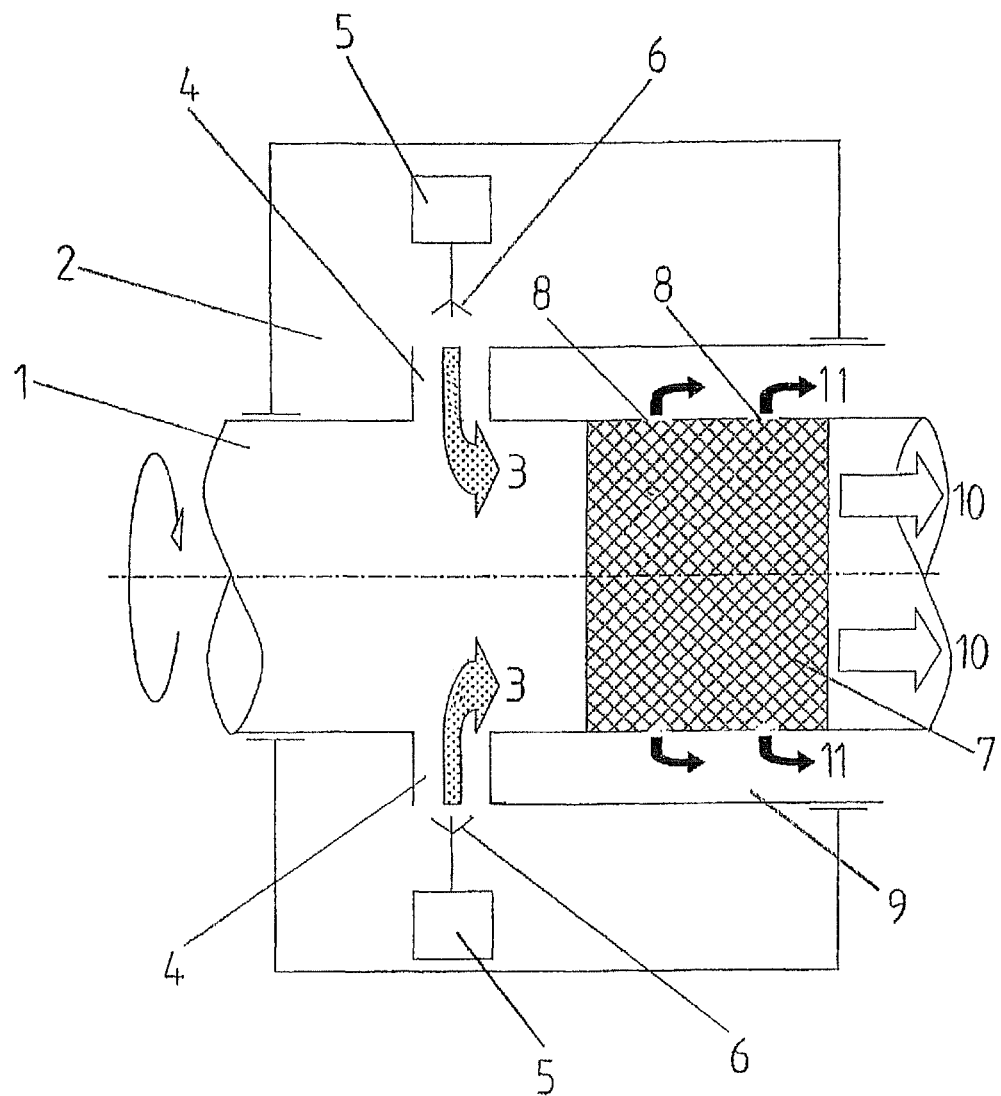

CENTRIFUGAL OIL SEPARATOR FOR AN AIRCRAFT ENGINE

This invention relates to a centrifugal oil separator for an aircraft engine for separating the oil particles contained in the vent air, with the oil separator including a rotating hollow body with a metallic foam body attached therein and at least one high-voltage electrode arranged upstream of the metallic foam body.

In order to avoid excess air pressure in the oil tank, the gearbox and the bearing chambers, a venting arrangement is integrated in the lubricating system of an engine. However, the air vented from the bearing chambers and the gearbox of the aircraft engine contains oil particles which must be removed as completely as possible from the airflow before being discharged to the atmosphere to both keep oil losses and the disadvantageous consequences of high oil consumption low and minimize the negative effects of air with high oil content flowing off to the environment.

For separating the oil content in the air, oil separators based on centrifugal action are employed whose operation can further be improved by a metallic foam structure integrated in the centrifugal oil separator and co-rotating with the latter.

For further improving the effect of the metallic foam structure in terms of the rate of separation, Specification DE 102006058343A1 proposes the provision of at least one high-voltage discharge electrode upstream of the metallic foam structure. As a result of the electrostatic forces issuing from the high-voltage discharge electrodes, the air molecules become negatively charged. This excessive charge is passed on to the oil particles which, due to electrostatic attraction, lodge on the surface of the lower charged—earthed—metallic foam structure, with even very small oil particles with low mass being lodged on the surfaces of the metallic foam structure and separated from the airflow.

The known centrifugal oil separators of the type mentioned above are separately arranged units and, as such, are disadvantageous in respect of the weight and space requirements incurred with them.

It is a broad aspect of the present invention to provide a centrifugal oil separator for an aircraft engine which, while ensuring a high rate of separation, is simply designed and features low space and weight requirements.

It is a particular object of the present invention to provide solution to the above problematics by a centrifugal oil separator designed in accordance with the features described herein.

Advantageous embodiments of the present invention become apparent from the present description.

The present invention, in essence, provides that the metallic foam body is integrated into a hollow-type engine shaft with oil exit holes provided therein in the area of the metallic foam body which issue into a collecting channel. Air inlet openings arranged upstream of the metallic foam body in the engine shaft issue into a vent air chamber which is statically arranged on the circumference of the engine shaft and connected to vent air inlet lines and in which high-voltage electrodes connected to a high-voltage generator are arranged. The oil droplets contained in the vent air are electrostatically charged outside the hollow body in a vent air chamber, i.e. before being forwarded to the engine shaft. When passing the metallic foam body, even minute oil particles, as they are higher charged than the metallic foam, are drawn to the walls of the metallic foam body and essentially completely carried off by centrifugal action in the radial direction, while the cleaned air flows on axially and enters the atmosphere via air outlets in the engine nacelle, actually without creating an oil mist plume and contaminating the engine nacelle and the aircraft or causing damage to health. Furthermore, the space-savingly designed low-weight oil separator can be assembled with low effort. Older engine models are upgradeable with the proposed oil separator.

The metallic foam body completely fills the free cross-section of the engine shaft and is earthed via the engine shaft, as a result of which the metallic foam body has lower charge than the electrostatically charged oil particles.

In an embodiment of the present invention a product known under the trade name Retimet® is used as metallic foam body.

An exemplary embodiment of the present invention is more fully described in light of the accompanying FIGURE.

FIG. 1 schematically shows a centrifugal oil separator integrated into a hollow-type shaft.

The oil particle-mixed vent air discharged from the oil tank, the gearbox and the bearing chambers of the engine gets into a vent air chamber 2 statically arranged on the circumference of a hollow-type engine shaft 1. The vent airflow 3 flows via air inlet openings 4 provided in the engine shaft 1 into the engine shaft 1 rotating at high speed. Disposed in the vent air chamber 2, here in front of the air inlet openings 4, are high-voltage electrodes 6 connected to a high-voltage generator 5 which electrostatically charge the oil droplets in the vent airflow 3. With larger oil droplets already having been removed from the vent airflow 3 by centrifugal forces, further oil droplets, in particular also smaller ones, are, due to multiple deflections, separated from the vent airflow 3 in a metallic foam body 7 provided in the engine shaft 1 and filling out the cross-sectional area of the latter, and, as they are electrostatically charged by the high-voltage electrodes 6, get lodged on the walls of the metallic foam body 7 earthed via the engine shaft 1 and are conveyed to the periphery of the metallic foam body 7 by centrifugal action and carried off via oil exit holes 8 in the engine shaft 1 into a collecting channel 9 surrounding the engine shaft 1. The oil 11 separated in this manner from the vent air is extracted from the collecting channel 9 and returned to the lubricating oil tank of the engine (not shown), where it can be reused, while the cleaned vent air 10 flows off axially from the metallic foam body 7 into the atmosphere via air outlets (not shown), While the space-saving arrangement of the metallic foam body 7 in the engine shaft 1 and the relatively small radius of the latter involves limited centrifugal forces, indeed even zero in the rotational axis, the separation rate is extremely high owing to the attraction of even minute—electrostatically charged—oil droplets to the metallic foam body 7 that essentially oil-free air is discharged to the outside, neither constituting a danger to health by inhalation or skin contact nor producing visible, fog-like oil mist contaminating the exterior of the engine nacelle or the aircraft. Furthermore, the above described electrostatic supplement for a centrifugal oil separator is characterized by ease of assembly and low weight as well as the possibility to upgrade older engine models. In certain flight phases, it may also be desirable to limit oil separation from the vent air i.e. to reduce the rate of separation. In this case, voltage supply to the high-voltage electrodes 6 will be de-activated.

List of Reference Numerals
1 Engine shaft
2 Vent air chamber
3 Vent airflow, air-oil mixture
4 Air inlet openings in 1
5 High-voltage generator
6 High-voltage electrodes
7 Metallic foam body
8 Oil exit holes in 1

9 Collecting channel
10 Cleaned vent air
11 Oil

What is claimed is:

1. Centrifugal oil separator for an aircraft engine for separating the oil particles contained in the vent air, with the oil separator including a rotating hollow body with a metallic foam body attached therein and at least one high-voltage electrode arranged upstream of the metallic foam body, characterized in that the metallic foam body is integrated into a hollow engine shaft with oil exit holes provided therein in the area of the metallic foam body which issue into a collecting channel, with air inlet openings arranged upstream of the metallic foam body in the engine shaft issuing into a vent air chamber which is statically arranged on the circumference of the engine shaft and connected to vent air inlet lines and in which the high-voltage electrodes connected to a high-voltage generator are arranged.

2. Centrifugal oil separator in accordance with claim 1, characterized in that the metallic foam body, which is earthed via the engine shaft, completely fills the free cross-section of the engine shaft.

3. Centrifugal oil separator in accordance with claim 1, characterized in that the metallic foam body is a product known under the trade name Retimet®.

\* \* \* \* \*